United States Patent
Jung et al.

(10) Patent No.: US 10,160,335 B2
(45) Date of Patent: Dec. 25, 2018

(54) POWER DISTRIBUTING APPARATUS OF VEHICLE

(71) Applicants: HYUNDAI MOTOR COMPANY, Seoul (KR); KIA MOTORS CORPORATION, Seoul (KR); YURA CORPORATION CO., LTD., Seongnam-si, Gyeonggi-do (KR)

(72) Inventors: Yun Jae Jung, Suwon-si (KR); Kwang Moo Lee, Suwon-si (KR); Gil Woo Jung, Suwon-si (KR)

(73) Assignees: HYUNDAI MOTOR COMPANY, Seoul (KR); KIA MOTORS CORPORATION, Seoul (KR); YURA CORPORATION CO., LTD., Seongnam-si, Gyeonggi-do (KR)

( * ) Notice: Subject to any disclaimer, the term of this patent is extended or adjusted under 35 U.S.C. 154(b) by 284 days.

(21) Appl. No.: 15/154,395

(22) Filed: May 13, 2016

(65) Prior Publication Data
US 2017/0101019 A1    Apr. 13, 2017

(30) Foreign Application Priority Data
Oct. 7, 2015  (KR) .................. 10-2015-0140931

(51) Int. Cl.
*B60L 11/18* (2006.01)

(52) U.S. Cl.
CPC ....... *B60L 11/1809* (2013.01); *B60L 11/1812* (2013.01); *B60L 11/1816* (2013.01); *B60L 11/1818* (2013.01)

(58) Field of Classification Search
None
See application file for complete search history.

(56) References Cited

U.S. PATENT DOCUMENTS

| | | | |
|---|---|---|---|
| 5,581,171 A * | 12/1996 | Kerfoot | B60L 11/1811 320/137 |
| 5,816,850 A | 10/1998 | Yamada et al. | |
| 8,662,222 B1 | 3/2014 | Lee et al. | |
| 2010/0127565 A1 * | 5/2010 | Fukazu | B60K 1/00 307/9.1 |
| 2011/0111649 A1 * | 5/2011 | Garascia | H01M 2/1077 439/890 |
| 2011/0148191 A1 * | 6/2011 | Nakamura | B60L 3/0069 307/10.1 |

(Continued)

FOREIGN PATENT DOCUMENTS

| | | |
|---|---|---|
| CN | 102362421 A | 2/2012 |
| CN | 104442629 A | 3/2015 |

(Continued)

*Primary Examiner* — Jared Fureman
*Assistant Examiner* — Joel Barnett
(74) *Attorney, Agent, or Firm* — McDermott Will & Emery LLP (57) ABSTRACT

A power distributing apparatus of a vehicle includes an on-board charger (OBC) for charging a battery of an electric vehicle, an electric power control unit (EPCU) stacked on the on-board charger for controlling power of the electric vehicle, and a junction block including a first bus bar block and a second bus bar block supplying a current, wherein in the junction block, the first bus bar block is coupled to the on-board charger and the second bus bar block is coupled to the EPCU.

20 Claims, 9 Drawing Sheets

(56) References Cited

U.S. PATENT DOCUMENTS

2013/0134938 A1* 5/2013 Bianco .................. H02J 7/00
                                              320/109
2014/0319909 A1* 10/2014 Suzuki ................. B60L 3/003
                                              307/10.1

FOREIGN PATENT DOCUMENTS

| JP | 2003-175781 A | 6/2003 |
|---|---|---|
| KR | 10-1000594 B1 | 12/2010 |
| KR | 10-1001887 B1 | 12/2010 |
| KR | 20-0470700 Y1 | 1/2014 |
| KR | 10-2014-0050159 A | 4/2014 |
| KR | 10-2014-0136152 A | 11/2014 |
| KR | 10-2015-0060318 A | 6/2015 |

* cited by examiner

POWER DISTRIBUTING APPARATUS OF VEHICLE

CROSS-REFERENCE TO RELATED APPLICATION

This application claims the benefit of priority to Korean Patent Application No. 10-2015-0140931, filed on Oct. 7, 2015 with the Korean Intellectual Property Office, the disclosure of which is incorporated herein in its entirety by reference.

TECHNICAL FIELD

The present disclosure relates to a power distributing apparatus of a vehicle, and more particularly, to a power distributing apparatus of a vehicle in which a junction block is electrically coupled directly to peripheral components.

BACKGROUND

Generally, a vehicle is provided with a junction block in order to prevent an excessive level of current from flowing to various electronic components. Fuses, blocking a circuit are instantaneously fused when a current of a predetermined numerical value or more flows thereto, and relays, that operate when an input value arrives at a predetermined value to open and close another circuit, are accommodated in the junction block.

The junction block includes about twenty to forty fuses and about ten relays even though the numbers of fuses and relay may be slightly different depending on sizes and types of vehicles. When the fuses and the relays are dispersed, a structure of the fuses and the relays may be complicated, and control of the fuses and the relays is difficult. Therefore, the junction block is used to integrate the fuses and the relays in one place and/or device to distribute power in each mode.

Figure 1:
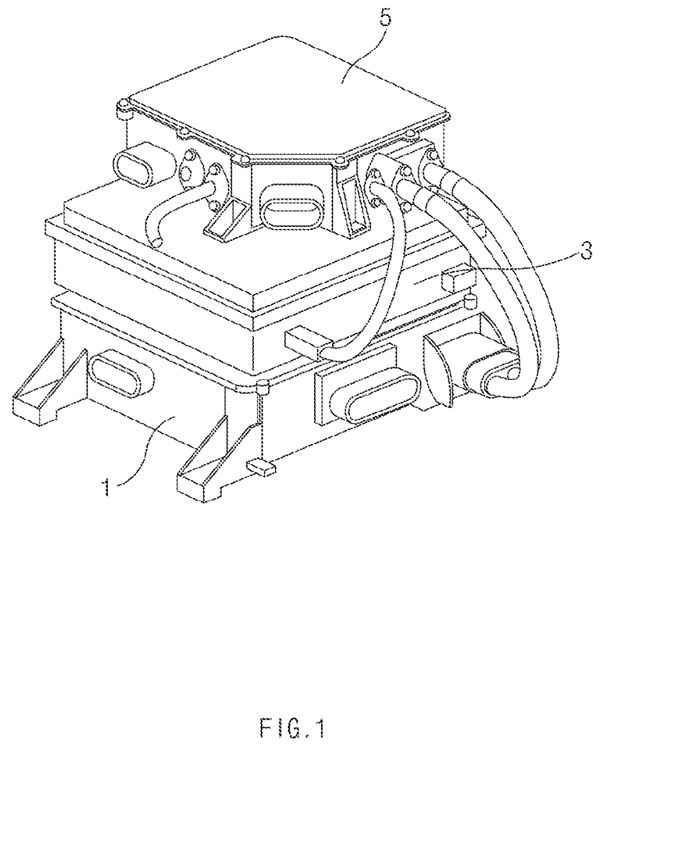
FIG. 1 is a perspective view illustrating a power distributing apparatus of a vehicle according to the related art.

FIG. 1 is a perspective view illustrating a power distributing apparatus of a vehicle according to the related art.

Referring to FIG. 1, a junction block 5 is electrically coupled to each of peripheral components 1 and 3 in an indirect coupling scheme by wires. According to the indirect coupling scheme described above, spaces for the wires connecting the junction block 5 and the peripheral components 1 and 3 to each other should be separately formed. In addition, since space efficiency may be improved depending on disposition paths of wire connectors, research into the disposition paths should be separately performed.

SUMMARY

The present disclosure has been made to solve the above-mentioned problems occurring in the prior art while advantages achieved by the prior art are maintained intact.

An aspect of the present disclosure provides a power distributing apparatus of a vehicle capable of securing spaces and reducing a weight depending on coupling between a junction block and peripheral components.

Aspect of the present disclosure is not limited to the above-mentioned aspect. That is, other objects that are not mentioned may be obviously understood by those skilled in the art from the following specification.

According to an exemplary embodiment of the present disclosure, a power distributing apparatus of a vehicle includes: an on-board charger (OBC) for charging a battery of an electric vehicle; an electric power control unit (EPCU) stacked on the on-board charger and controlling power of the electric vehicle; and a junction block provided with a first bus bar block and a second bus bar block supplying a current.

In the junction block, the first bus bar block is coupled to the on-board charger, and the second bus bar block is coupled to the EPCU.

The junction block may be disposed on side surfaces of the on-board charger and the EPCU, such that the first bus bar block and the second bus bar block are coupled to each other.

The on-board charger may be provided with: a first insertion part into which the first bus bar block is inserted; and a first coupling pin extended from the first insertion part toward the junction block.

The EPCU may be provided with: a second insertion part into which the second bus bar block is inserted; and a second coupling pin extended from the second insertion part toward the junction block.

The EPCU may be stacked on the on-board charger so that the center of the second insertion part of the EPCU is disposed directly on the center of the first insertion part of the on-board charger.

The first coupling pin and the second coupling pin may be formed in parallel with the first bus bar block and the second bus bar block.

The junction block may be provided with a plurality of mounting taps coupled to the OBC and the EPCU, and the mounting taps may protrude to support the first bus bar block and the second bus bar block.

The plurality of mounting taps may include: a first mounting tap in which a first coupling hole coupled to the first coupling pin is formed; and a second mounting tap in which a second coupling hole coupled to the second coupling pin is formed.

The first mounting tap may be coupled to the on-board charger by a bolt so as to fix the first bus bar block.

The second mounting tap may be coupled to the EPCU by a bolt so as to fix the second bus bar block.

The first mounting tap may be disposed in parallel with the first bus bar block, and the second mounting tap may be disposed in parallel with the second bus bar block.

The EPCU may be stacked on the on-board charger so that the first insertion part and the second insertion part are disposed on the same line in a vertical direction.

The junction block may include: a body part having an accommodating space formed therein; a cover for opening and closing the body part; and a fuse case seating and connecting high voltage fuses to each other therein, the first bus bar block and the second bus bar block may be electrically connected to the fuse case by separate bus bars, and gaskets may be installed in the first bus bar block and the second bus bar block and be closely adhered to side surfaces of the on-board charger and the EPCU.

A plurality of gaskets made of an elastic material may be provided and be installed in the first bus bar block and the second bus bar block protruding to the outside of the body part.

The first bus bar block and the second bus bar block may include, respectively: a plurality of terminals electrically connected to each other; and a first housing and a second housing in which the plurality of terminals are installed, and the first housing and the second housing are installed in the body part.

The first housing and the second housing may be installed with rubber packings, respectively, and the rubber packings may be enclosed by the gaskets.

The first housing and the second housing may be provided with packing grooves in which the rubber packings are seated and installed.

A protrusion may be formed on an outer peripheral surface of the rubber packing toward the gasket.

Detailed contents of other exemplary embodiments are described in a detailed description and are illustrated in the accompanying drawings.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Various advantages and features of the present disclosure and methods accomplishing them will become apparent from the following description of exemplary embodiments with reference to the accompanying drawings. However, the present disclosure is not limited to exemplary embodiments to be described below, but may be implemented in various different forms, these exemplary embodiments will be provided only in order to make the present disclosure complete and allow those skilled in the art to completely recognize the scope of the present disclosure, and the present disclosure will be defined by the scope of the claims. Throughout the specification, like reference numerals denote like elements.

Hereinafter, a power distributing apparatus of a vehicle according to exemplary embodiments of the present disclosure will be described with reference to the accompanying drawings.

Figure 2:
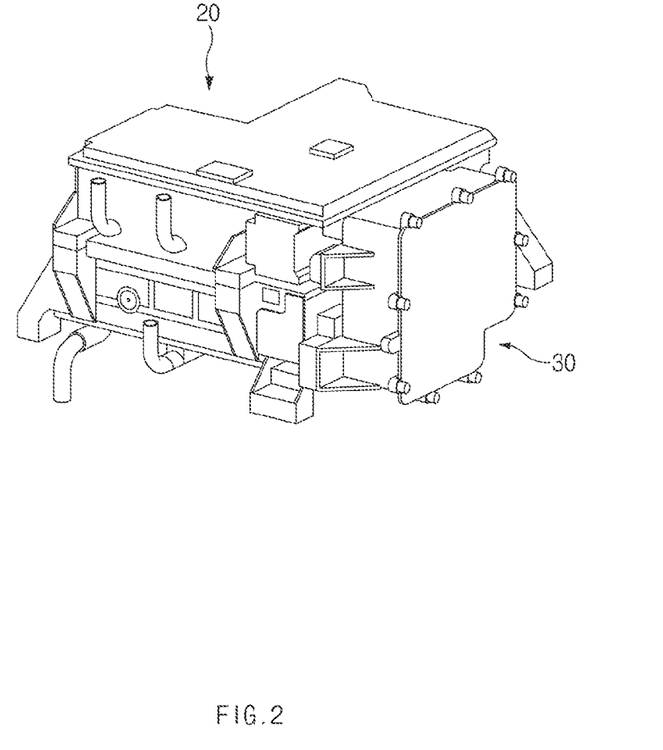
FIG. 2 is a perspective view illustrating a power distributing apparatus of a vehicle according to an exemplary embodiment of the present disclosure.
Figure 3A:
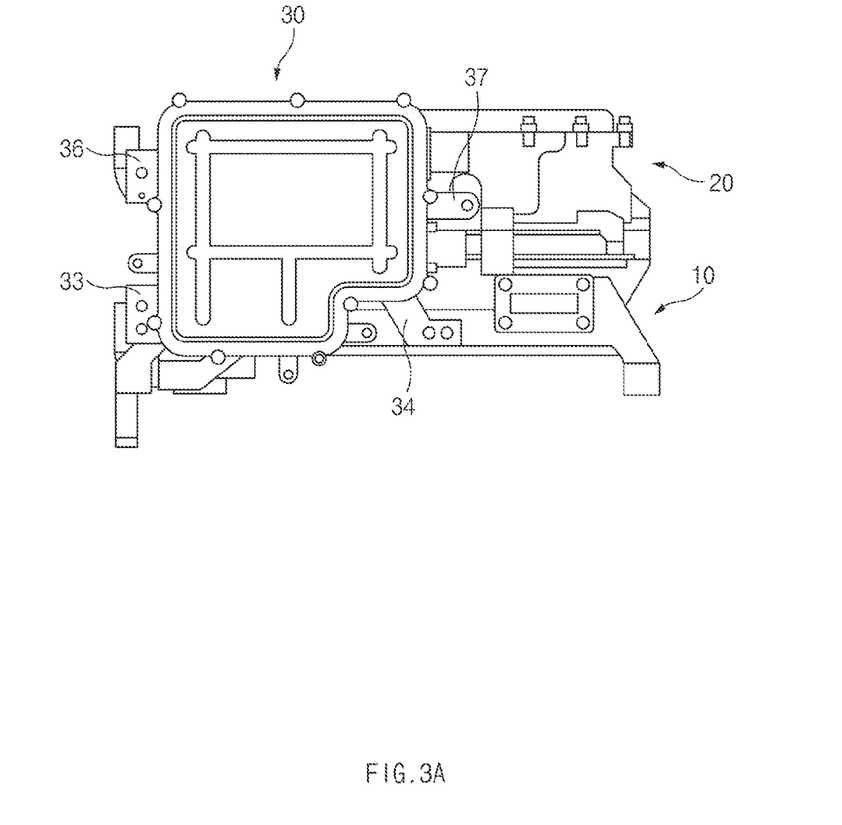
FIGS. 3A and 3B are, respectively, a front view and a side view illustrating a junction block mounted at peripheral components.
Figure 3B:
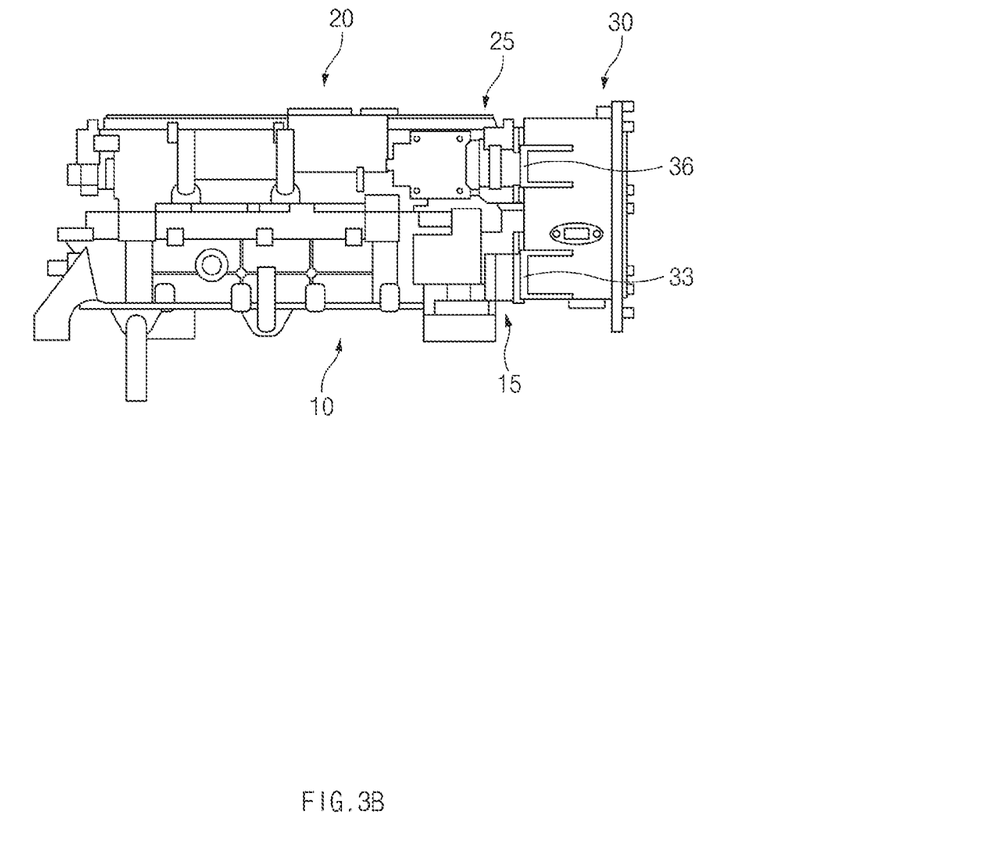
Figure 4:
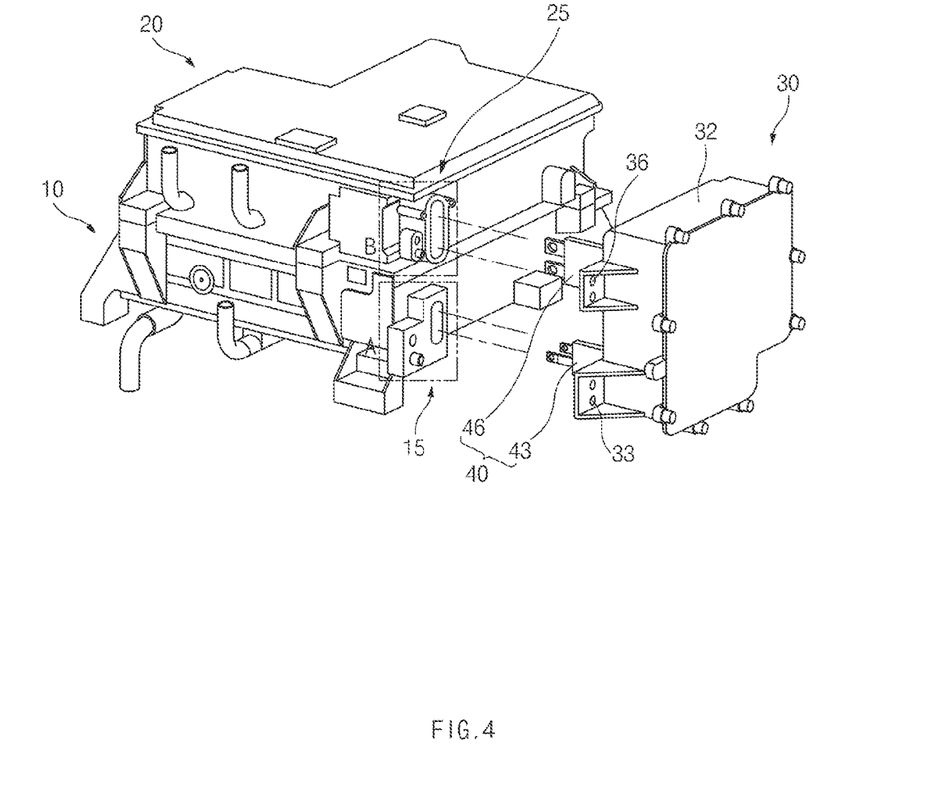
FIG. 4 is an exploded perspective view of the power distributing apparatus of FIG. 2.
Figure 5A:
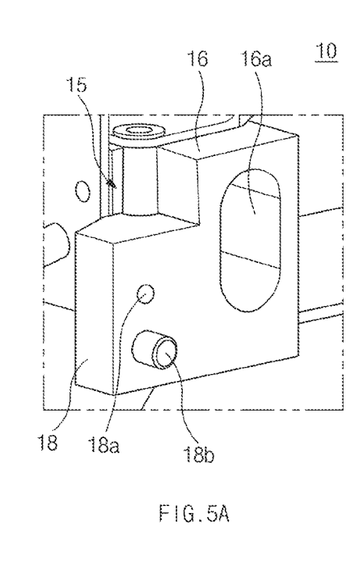
FIGS. 5A and 5B are, respectively, partially enlarged views illustrating part 'A' and part 'B' of FIG. 4.
Figure 5B:
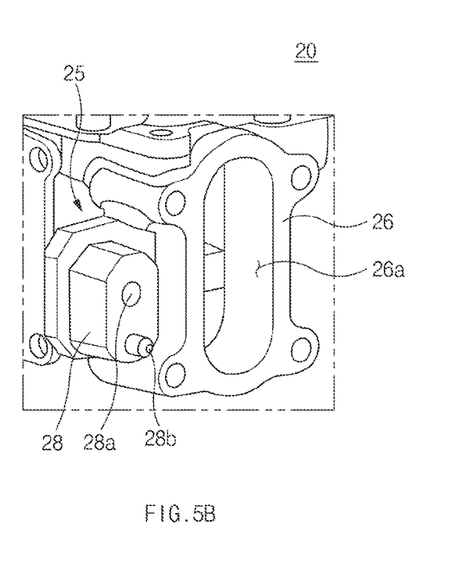
Figure 6:
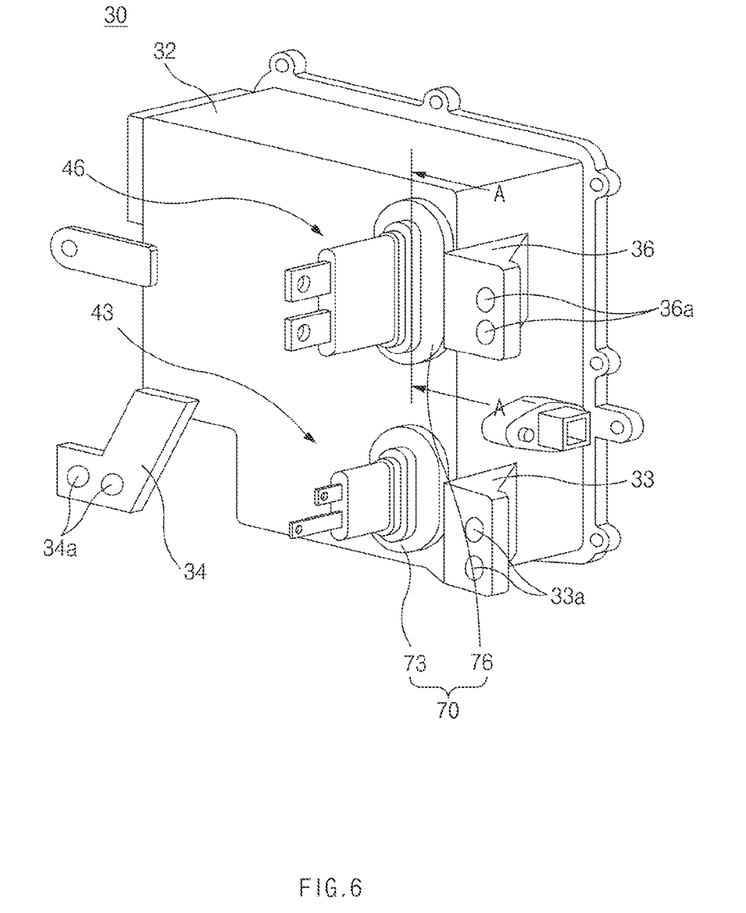
FIG. 6 is a perspective view of a junction block.
Figure 7:
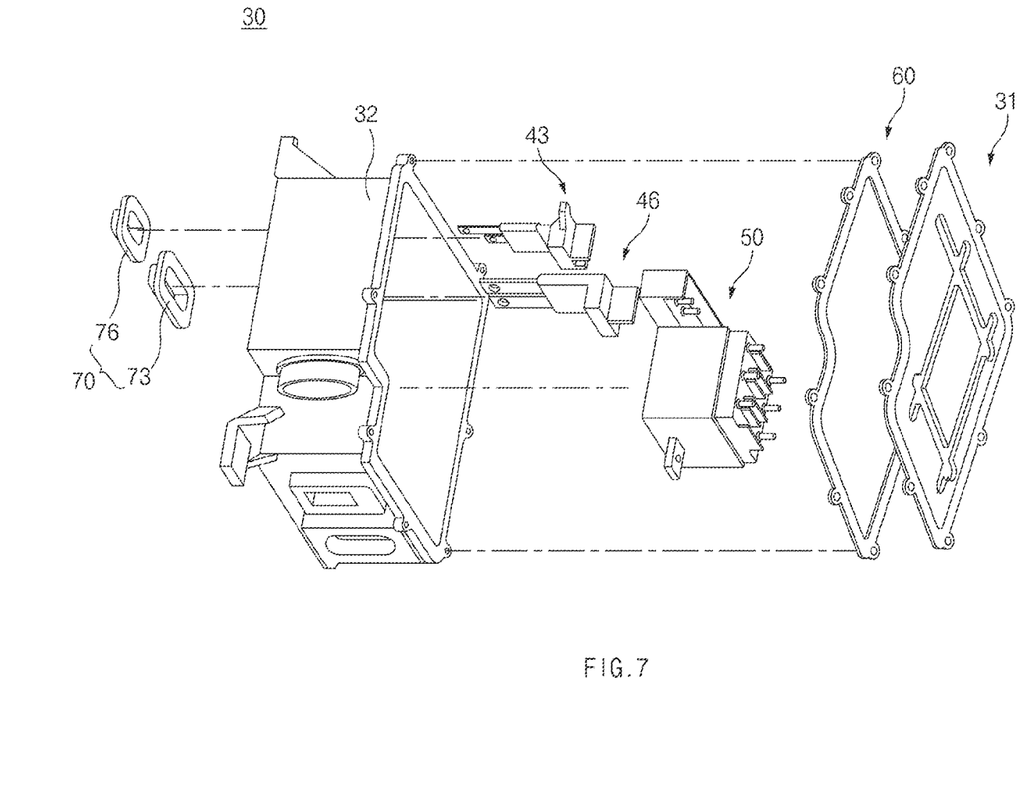
FIG. 7 is an exploded perspective view of the junction block of FIG. 6.
Figure 8:
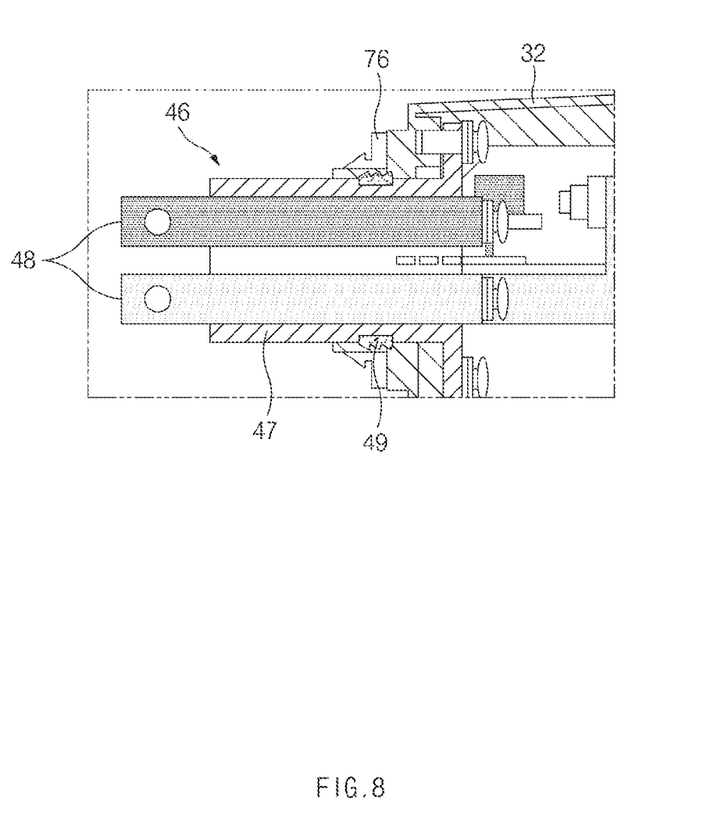
FIG. 8 is a cross-sectional view taken along line A-A of FIG. 6.

FIG. 2 is a perspective view illustrating a power distributing apparatus of a vehicle according to an exemplary embodiment of the present disclosure, FIGS. 3A and 3B are, respectively, a front view and a side view illustrating a junction block mounted at peripheral components of FIG. 2, FIG. 4 is an exploded perspective view of the power distributing apparatus of FIG. 2, FIGS. 5A and 5B are, respectively, partially enlarged views illustrating part 'A' and part 'B' of FIG. 4, FIG. 6 is a perspective view of a junction block, FIG. 7 is an exploded perspective view of the junction block of FIG. 6, and FIG. 8 is a cross-sectional view taken along line A-A of FIG. 6.

A power distributing apparatus of a vehicle according to an exemplary embodiment may be modified by those skilled in the art, and the present exemplary embodiment relates to a power distributing apparatus of a vehicle.

FIG. 2 is a perspective view illustrating a power distributing apparatus of a vehicle according to an exemplary embodiment of the present disclosure, FIGS. 3A and 3B are, respectively, a front view and a side view illustrating a junction block mounted at peripheral components of FIG. 2, and FIG. 4 is an exploded perspective view of the power distributing apparatus of FIG. 2.

A power distributing apparatus of a vehicle according to an exemplary embodiment of the present disclosure will be described with reference to FIGS. 2 to 4. The power distributing apparatus of a vehicle according to an exemplary embodiment of the present disclosure may include an on-board charger (OBC) 10 for charging a battery of an electric vehicle, an electric power control unit (EPCU) 20 stacked on the on-board charger 10 and controlling power of the electric vehicle, and a junction block 30 provided with a first bus bar block 43 and a second bus bar block 46 supplying a current.

FIG. 4 is an exploded perspective view of the power distributing apparatus of FIG. 2, and FIGS. 5A and 5B are, respectively, partially enlarged views illustrating part 'A' and part 'B' of FIG. 4.

The power distributing apparatus of a vehicle according to an exemplary embodiment of the present disclosure will be described with reference to FIGS. 4 to 5B. The on-board charger 10 may be provided in an engine room so as to charge the battery of the electric vehicle. The EPCU 20 may be stacked on the on-board charger 10, and the junction block 30 may be coupled to a side surface of the EPCU 20 stacked on the on-board charger 10.

The on-board charger 10 may be provided with a first insertion part 16 into which the first bus bar block 43 of the junction block 30 is inserted. The on-board charger 10 may be provided with a first coupling pin 18b extended from the first insertion part 16 toward the junction block 30.

In more detail, the on-board charger 10 may be provided with the first coupling part 15 formed toward the junction block 30. The first coupling part 15 may be provided with the first insertion part 16 in which a first insertion hole 16a into which the first bus bar block 43 is inserted is formed, and a first extension part 18 extended from the first insertion part 16.

The first extension part 18 may be provided with the first coupling pin 18b coupled to the junction block 30 and a first bolting hole 18a bolted to the junction block 30. The first coupling pin 18b may be formed in parallel with the first bus bar block 43 inserted into the first insertion part 16. The first extension part 18 may be provided with the first bolting hole 18a coupled to the junction block 30 by a bolt.

The first coupling pin 18b and the first bolting hole 18a may be coupled to the junction block 30 to improve coupling force. In addition, the first coupling pin 18b and the first bolting hole 18a may be coupled to the first bus bar block 43 adjacent to the first bus bar block 43, thereby making it possible to prevent separation of the first bus bar block 43 from the first insertion part 16.

The EPCU 20 may be provided so as to control the power of the electric vehicle, and may be stacked on the on-board charger 10. The EPCU 20 may be provided with a second insertion part 26 into which the second bus bar block 46 is inserted. The EPCU 20 may be provided with a second coupling pin 28b extended from the second insertion part 26 toward the junction block 30.

In more detail, the EPCU 20 may be provided with the second coupling part 25 formed toward the junction block 30. The second coupling part 25 may be provided with the second insertion hole 26a into which the second bus bar block 46 is inserted. The second coupling part 25 may be provided with a second extension part 28 extended from a second insertion part 26. The second extension part 28 may be provided with the second coupling pin 28*b* coupled to the junction block 30. The second extension part 28 may be provided with the second coupling pin 28*b* and a second bolting hole 28*a* bolted to the junction block 30.

The second insertion part 26 may be stacked on the first insertion part 16 so that the center thereof is put directly on the center of the first insertion part 16 of the on-board charger 10. Therefore, the second insertion part 26 of the EPCU 20 may be disposed in the same direction as that of the first insertion part 16, and the second coupling pin 28*b* of the EPCU 20 may be also directed in the same direction as that of the first coupling pin 18*b*.

The EPCU 20 may be stacked on the on-board charger 10 so that the first insertion part 16 of the on-board charger 10 and the second insertion part 26 of the EPCU 20 are put on the same line in a vertical direction. The second coupling pin 28*b* may be formed in parallel with the second bus bar block 46 inserted into the second insertion part 26, and may be coupled to the junction block 30.

FIG. 6 is a perspective view of a junction block, and FIG. 7 is an exploded perspective view of the junction block of FIG. 6.

The power distributing apparatus of a vehicle according to an exemplary embodiment of the present disclosure will be described with reference to FIGS. 6 and 7. The junction block 30 may be provided with a plurality of bus bar blocks 40 supplying a current. The plurality of bus bar blocks 40 may include the first bus bar block 43 and the second bus bar block 46. The junction block 30 may be coupled to side surfaces of the on-board charger 10 and the EPCU 20. In the junction block 30, the first bus bar block 43 may be coupled to the on-board charger 10, and the second bus bar block 46 may be coupled to the EPCU 20.

The junction block 30 may include gaskets 70 disposed in the first bus bar block 43 and the second bus bar block 46 to thereby be disposed on the side surfaces of the on-board charger 10 and the EPCU 20. The junction block 30 may be provided with a plurality of mounting taps 33, 34, 36 and 37 coupled to the on-board charger 10 and the EPCU 20. The mounting taps 33, 34, 36 and 37 may protrude to support the first bus bar block 43 and the second bus bar block 46.

The junction block 30 may further include the gaskets 70 installed in the first bus bar block 43 and the second bus bar block 46. The junction block 30 may include a body part 32 having an accommodating space formed therein, and a fuse case seating and connecting high voltage fuses to each other therein.

The body part 32 may have the accommodating space formed therein, and a plurality of components such as bus bar blocks, fuses, and the like, may be disposed in the accommodating space. The body part 32 may be provided with the plurality of mounting taps 33, 34, 36 and 37 coupled to the on-board charger 10 and the EPCU 20.

The first bus bar block 43 and the second bus bar block 46 may be installed in the body part 32 so as to partially protrude to the outside of the body part 32. The body part 32 may accommodate a plurality of components therein and may be covered with a cover 31 to protect the components from the outside. A rubber pad 60 may be disposed between the body part 32 and the cover 31.

The plurality of mounting taps 33, 34, 36 and 37 may protrude on a side surface of the body part 32. The mounting taps 33, 34, 36 and 37 may be provided with a plurality of coupling holes coupled to the on-board charger 10 and the EPCU 20. The mounting taps 33, 34, 36 and 37 may be formed on the side surface of the body part 32 so as to be perpendicular to the first bus bar block 43 and the second bus bar block 46.

A first mounting tap 33 may be coupled to the on-board charger 10 by a bolt 80 so as to fix the first bus bar block 43. The first mounting tap 33 may be disposed in parallel with the first bus bar block 43 and a second mounting tap 36 may be disposed in parallel with the second bus bar block 46.

In more detail, the first mounting tap 33 may be provided with a plurality of first coupling holes 33*a*. One of the plurality of first coupling holes 33*a* may be coupled to the first coupling pin 18*b*, and the other of the plurality of first coupling holes 33*a* may be coupled to the first bolting hole 18*a* by a bolt. The second mounting tap 36 may be formed above the first mounting tap 33 in the vertical direction. The second mounting tap 36 may be provided with a plurality of second coupling holes 36*a*. One of the plurality of second coupling holes 36*a* may be coupled to the second coupling pin 28*b*, and the other of the plurality of second coupling holes 36*a* may be coupled to the second bolting hole 28*a* by a bolt.

In addition, a third mounting tap 34 may be provided with a plurality of third coupling holes 34*a* to thereby be coupled to bolting holes (not illustrated) of the on-board charger 10, and a fourth mounting tap 37 may also be coupled to bolting holes (not illustrated) of the on-board charger 10.

Therefore, the junction block 30 may support both side surfaces of the on-board charger 10 and the ECPU 20. That is, the junction block 30 and the on-board charger 10 may be supported by and coupled to each other at two points at each of the left and the right, that is, a total of four points, such that a coupling force between the junction block 30 and the on-board charger 10 is improved.

The plurality of bus bar blocks 40 may include the first bus bar block 43 and the second bus bar block 46. Here, the first bus bar block 43 may be connected to the on-board charger 10, and the second bus bar block 46 may be connected to the EPCU 20.

FIG. 8 is a cross-sectional view taken along line A-A of FIG. 6.

Here, referring to FIG. 8, the first bus bar block 43 may be provided with a plurality of terminals electrically connected to each other. The first bus bar block 43 may include a first housing in which the plurality of terminals 48 are installed. The second bus bar block 46 may be provided with a plurality of terminals electrically connected to each other. The second bus bar block 46 may include a second housing in which the plurality of terminals 48 are installed. The first housing and the second housing 47 may be installed in the body part 32. The first housing and the second housing may be installed with rubber packings.

In more detail, FIG. 8, illustrating the second bus bar block 46, will be described by way of example. The second housing 47 may be installed with a rubber packing 49. The rubber packing 49 of the second housing 47 may be enclosed by a second gasket 76. The second housing 47 may be provided with a packing groove in which the rubber packing 49 is seated. A protrusion may be formed on an outer peripheral surface of the rubber packing 49 toward the gasket 70. The first bus bar block 43 and the second bus bar block 46 may be coupled so that terminals thereof protrude to the outside of the body part 32.

As described above, the rubber packing 47 and the second gasket 76 installed in the second housing 47 may be similarly applied to the first housing of the first bus bar block 43. Therefore, a description for a rubber packing and a gasket applied to the first housing will be omitted.

Again, referring to FIGS. 6 and 7, the fuse case 50 may be provided so as to seat and connect the high voltage fuses to each other therein. The fuse case 50 may be electrically connected to bus bars connected to a plurality of terminals, and may be accommodated in the body part 32. The first bus bar block 43 and the second bus bar block 46 may be electrically connected to the fuse case 50 by separate bus bars.

The gaskets 70 may be installed in the first bus bar block 43 and the second bus bar block 46 partially protruding to the outside of the junction block 30. A plurality of gaskets 70 made of an elastic material may be provided, and be installed in the first bus bar block 43 and the second bus bar block 46 protruding to the outside of the body part 32.

The gaskets 70 may include a first gasket 73 installed in the first bus bar block 43 and the second gasket 76 installed in the second bus bar block 46. The gasket 70 may be provided on an outer peripheral surface of the rubber packing 49 so as to enclose the rubber packing 49, as illustrated in FIG. 8. The rubber pad 60, which may be made of an elastic material, may be compressed by elasticity of the gasket 70, such that air-tightness may be improved.

An operation of the power distributing apparatus of a vehicle according to an exemplary embodiment of the present disclosure configured as described above will be described.

FIG. 2 is a perspective view illustrating a power distributing apparatus of a vehicle according to an exemplary embodiment of the present disclosure, FIG. 4 is an exploded perspective view of the power distributing apparatus of FIG. 2, and FIG. 6 is a perspective view of a junction block.

The power distributing apparatus of a vehicle according to an exemplary embodiment of the present disclosure will be described with reference to FIGS. 2, 4 and 6. The EPCU 20 may be stacked and mounted on the on-board charger 10 so as to be mounted in the engine room of the vehicle. The on-board charger 10 and the EPCU 20 may be fixed to each other by bolting therebetween so as to prevent movement of the EPCU 20 from the on-board charger 10.

The junction block 30 may be coupled to the side surfaces of the on-board charger 10 and the EPCU 20, thereby making it possible to fix the on-board charger 10 and the EPCU 20. Here, the first bus bar block 43 of the junction block 30 may be directly coupled to the first insertion part 16 of the on-board charger 10 to thereby be electrically connected to the first insertion part 16.

In addition, the second bus bar block 46 of the junction block 30 may be directly coupled to the second insertion part 26 of the EPCU 20 stacked on the on-board charger 10 to thereby be electrically connected to the second bus bar block 46.

Meanwhile, the first coupling part 15 may be coupled to the first mounting tap 33 of the junction block 30, and the second coupling part 25 may be coupled to the second mounting tap 36.

Here, the junction block 30 may be coupled so that a spaced space between the first bus bar block 43 and the first insertion part 16 is not formed. Therefore, separation of the first bus bar block 43 and the second bus bar block 46 from the first insertion part 16 and the second insertion part 26 may be prevented.

In addition, in the junction block 30, the gaskets 70 may be compressed at the time of coupling the first mounting tap 33 and the second mounting tap 36, thereby further closely adhering the junction block 30 to the on-board charger 10 and the EPCU 20. Therefore, water-tightness between the junction block 30 and the on-board charger 10 and water-tightness between the junction block 30 and the EPCU 20 may be improved.

Meanwhile, the third mounting tap 34 of the junction block 30 may be coupled to the on-board charger 10, and the fourth mounting tap 37 of the junction block 30 may be coupled to the EPCU 20, thereby making it possible to more firmly fix the junction block 30.

According to the power distribution apparatus of a vehicle as described above, peripheral components and the junction block may be directly coupled to each other, such that a space may be secured and a weight and a cost may be reduced. The peripheral components may be fixed by the junction block such that they may be firmly fixed and independent air-tightness of the bus bar blocks is possible, such that air-tightness may be improved and accuracy of coupled surfaces between the peripheral components and the junction blocks is increased, such that assembling errors may be reduced.

The power distributing apparatus of a vehicle according to an exemplary embodiment of the present disclosure has the following one or more effects.

First, the peripheral components and the junction block are directly coupled to each other, such that the space may be secured and the weight and the cost may be reduced.

Second, in the power distributing apparatus of a vehicle according to an exemplary embodiment of the present disclosure, the peripheral components are fixed by the junction block such that fixing power may be improved.

Third, in the power distributing apparatus of a vehicle according to an exemplary embodiment of the present disclosure, independent air-tightness of the bus bar blocks is possible such that the air-tightness may be improved.

Fourth, in the power distributing apparatus of a vehicle according to an exemplary embodiment of the present disclosure, the accuracy of the coupled surfaces between the peripheral components and the junction blocks is increased, such that the assembling error may be reduced.

The effects of the present disclosure are not limited to the above-mentioned effects. That is, other effects that are not mentioned may be obviously understood by those skilled in the art from the claims.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A power distributing apparatus of a vehicle, comprising:
 an on-board charger (OBC) for charging a battery of an electric vehicle;
 an electric power control unit (EPCU) stacked on the on-board charger for controlling power of the electric vehicle; and
 a junction block including a first bus bar block and a second bus bar block supplying a current,
 wherein in the junction block, the first bus bar block is coupled to the on-board charger and the second bus bar block is coupled to the EPCU,
 wherein, at one side of the on-board charger facing the junction block, the on-board charger is provided with a first insertion part into which the first bus bar block is inserted, wherein, at one side of the EPCU facing the junction block, the EPCU is provided with a second insertion part into which the second bus bar block is inserted, the first and second bus bar block are inserted into the first and second insertion part each by a linear movement of the junction block toward the one side of the on-board charger and the one side of the EPCU.

2. The power distributing apparatus of a vehicle according to claim 1, wherein the junction block is disposed on side surfaces of the on-board charger and the EPCU, such that the first bus bar block and the second bus bar block are coupled to each other.

3. The power distributing apparatus of a vehicle according to claim 1, wherein the on-board charger is provided with:
a first coupling pin extended from the first insertion part toward the junction block.

4. The power distributing apparatus of a vehicle according to claim 3, wherein the EPCU is provided with:
a second coupling pin extended from the second insertion part toward the junction block.

5. The power distributing apparatus of a vehicle according to claim 1, wherein the EPCU is stacked on the on-board charger so that the center of the second insertion part of the EPCU is disposed directly on the center of the first insertion part of the on-board charger.

6. The power distributing apparatus of a vehicle according to claim 4, wherein the first coupling pin and the second coupling pin are formed in parallel with the first bus bar block and the second bus bar block.

7. The power distributing apparatus of a vehicle according to claim 4, wherein the junction block is provided with a plurality of mounting taps coupled to the OBC and the EPCU, and the mounting taps protrude to support the first bus bar block and the second bus bar block.

8. The power distributing apparatus of a vehicle according to claim 7, wherein the plurality of mounting taps includes:
a first mounting tap in which a first coupling hole coupled to the first coupling pin is formed; and
a second mounting tap in which a second coupling hole coupled to the second coupling pin is formed.

9. The power distributing apparatus of a vehicle according to claim 8, wherein the first mounting tap is coupled to the on-board charger by a bolt so as to fix the first bus bar block.

10. The power distributing apparatus of a vehicle according to claim 8, wherein the second mounting tap is coupled to the EPCU by a bolt so as to fix the second bus bar block.

11. The power distributing apparatus of a vehicle according to claim 8, wherein the first mounting tap is disposed in parallel with the first bus bar block, and
the second mounting tap is disposed in parallel with the second bus bar block.

12. The power distributing apparatus of a vehicle according to claim 7, wherein the EPCU is stacked on the on-board charger so that the first insertion part and the second insertion part are disposed on the same line in a vertical direction.

13. The power distributing apparatus of a vehicle according to claim 1, wherein the junction block includes:
a body part having an accommodating space formed therein;
a cover for opening and closing the body part; and
a fuse case seating and connecting high voltage fuses to each other therein, wherein the first bus bar block and the second bus bar block are electrically connected to the fuse case by separate bus bars.

14. The power distributing apparatus of a vehicle according to claim 13, wherein the junction block further includes:
gaskets installed in the first bus bar block and the second bus bar block, and the gaskets are closely adhered to side surfaces of the on-board charger and the EPCU.

15. The power distributing apparatus of a vehicle according to claim 14, wherein the first bus bar block and the second bus bar block include, respectively:
a plurality of terminals electrically connected to each other; and
a first housing and a second housing in which the plurality of terminals are installed,
wherein the first housing and the second housing are installed in the body part.

16. The power distributing apparatus of a vehicle according to claim 15, wherein the first housing and the second housing are installed with rubber packings, respectively, and the rubber packings are enclosed by the gaskets.

17. The power distributing apparatus of a vehicle according to claim 16, wherein the first housing and the second housing are provided with packing grooves in which the rubber packings are seated and installed.

18. The power distributing apparatus of a vehicle according to claim 16, wherein a protrusion is formed on an outer peripheral surface of the rubber packing toward the gasket.

19. A power distributing apparatus of a vehicle, comprising:
an on-board charger for charging a battery of an electric vehicle;
an EPCU stacked on the on-board charger for controlling power of the electric vehicle; and
a junction block including a first bus bar block coupled to the on-board charger and supplying a current and a second bus bar block coupled to the EPCU and supplying a current, and coupled to the first bus bar block and the second bus bar block to thereby be fixed to the on-board charger and the EPCU,
wherein, at one side of the on-board charger facing the junction block, the on-board charger is provided with a first insertion part into which the first bus bar block is inserted,
wherein, at one side of the EPCU facing the junction block, the EPCU is provided with a second insertion part into which the second bus bar block is inserted,
the first and second bus bar block are inserted into the first and second insertion part each by a linear movement of the junction block toward the one side of the on-board charger and the one side of the EPCU.

20. The power distributing apparatus of a vehicle according to claim 19, wherein the junction block includes:
a body part having an accommodating space formed therein; and
a fuse case seating and connecting high voltage fuses to each other therein,
wherein the fuse case is provided with the first bus bar block and the second bus bar block, and the first bus bar block and the second bus bar block are installed in the body part so as to partially protrude to the outside of the body part.

* * * * *